March 2, 1965  D. T. BATH  3,171,998
COMMUTATOR

Filed Nov. 29, 1961  3 Sheets-Sheet 1

Inventor
DUNCAN T. BATH by: *James L. Campbell*
ATTORNEY

Inventor
DUNCAN T. BATH

March 2, 1965 D. T. BATH 3,171,998
COMMUTATOR
Filed Nov. 29, 1961 3 Sheets-Sheet 3

Inventor
DUNCAN T. BATH
by: [signature]
ATTORNEY

United States Patent Office 3,171,998
Patented Mar. 2, 1965

3,171,998
COMMUTATOR
Duncan T. Bath, Peterborough, Ontario, Canada, assignor to Canadian General Electric Company, Limited, Toronto, Ontario, Canada, a company of Canada
Filed Nov. 29, 1961, Ser. No. 155,761
Claims priority, application Canada, Apr. 7, 1961, 820,698
12 Claims. (Cl. 310—235)

My invention relates to commutators for dynamoelectric machines and to a method for making the same.

In the manufacture of commutators for dynamoelectric machines, it has long been the practice to provide commutator segments with a V-shaped groove in each end of the segment. The segments and similarly shaped insulating barriers are arranged alternately to form an annulus and secured together in this form between a pair of clamping rings, each of which is formed with a V-shaped tongue adapted to grip the segments within a groove therein. If the segments are to be firmly secured, this type of construction demands considerable accuracy in forming both the V-shaped grooves in the segments and the V-shaped tongues of the clamping rings, that is, the tongues must fit snugly in the grooves. Close tolerances such as this usually entail machining the parts. Moreover, in all but very small commutators the clamping rings are generally made of steel, and the tongue of each ring must be insulated from the segments by means of an accurately formed mica cone. Therefore, the machining of the segments and the clamping rings along with the manufacture of the mica cones can account for a substantial proportion of the overall cost of making a commutator.

In a construction employing a pair of tongued clamping rings, the maximum length of the commutator is limited by the maximum allowable deflection of the segments under the action of centrifugal force and by the allowable stress in the tips of the V-shaped clamping rings. In addition, since the segments are usually made of copper, they and the steel shaft have different coefficients of thermal expansion. Consequently, allowance must be made to take care of axial expansion of the commutator due to changes of temperature and this introduces difficulties which increase with the axial length of the commutator segments. There is an additional disadvantage with the conventional type of construction in that the over-all length of the assembly tends to be relatively great, hence a large space must be provided for the commutator.

Commutators have also been built wherein the segments are secured along their entire length to a hub-like support. In such a construction, each segment is usually provided with a dove-tailed recess or bulbous projection along it inner edge. The support itself may consist of a mass of plastic material moulded into the recesses or around the projections so as to secure the segments to the plastic mass and thus provide a commutator construction wherein each segment is anchored to the support along its entire length. Generally, plastic materials are weak in tension and as a result commutators employing a plastic support have met with limited success in small machines only because long and heavy segments impose appreciable tension loads on the support due to centrifugal forces. In an effort to overcome this inherent weakness of a plastic support to pull apart, it has been proposed to embed rigid reinforcing members in the material. However, to be most effective, such reinforcing members must be placed where the stresses are greatest, which is in the region where the segments are anchored in the plastic. In the highly stressed regions, there is very little room for reinforcing members and their application introduces insulation problems because the members are usually made of steel or some other strong metal which is electrically conductive. Since reinforcement in this way is at best a partial solution only and since it introduces new difficulties, commutators employing a reinforced moulded plastic support have not been entirely satisfactory. Examples of the aforementioned commutator constructions appear in British Patents 196,726 and 661,815 dated February 8, 1922, and June 22, 1950, respectively.

Commutators employing a cast metal support have been proposed. In this type of construction, each segment is provided with some means into which molten metal will flow during the casting operation whereby the segment is keyed to the support proper. Such keying means may take the form of undercut grooves in the inner surface of the annular array of segments, which grooves may extend longitudinally or circumferentially of the array. Theoretically, cast metal supports can be made very strong and each segment can be secured to the support along its entire length, but in practice the manufacture of such commutators is considered difficult to control because the insulation used to insulate the segments from one another and from the support must withstand the high temperatures of the molten metal. In addition, the casting metal must have a coefficient of expansion compatible with that of the copper in the segments and the metal must contract upon solidification in such a way that the segments are drawn firmly together and to the support proper.

Another commutator construction in which the segments are secured along the length thereof to a metal support is disclosed and claimed in British Patent No. 795,-825 dated May 28, 1958. In this construction, a number of commutator segments are secured in position on a metal body of circular cross-section by deforming the material of the segments such that a root portion of each segment is expanded into one of a series of circumferentially spaced longitudinally extending undercut slots formed in the body, a layer of electrical insulating material being interposed between the root and the surface of its associated slot. This type of commutator construction requires close tolerances and the use of manufacturing techniques which are elaborate and difficult to control.

Therefore, it is the object of my invention to provide a commutator of the type wherein the segments are secured to a support along the entire length of each segment but which tends to avoid the foregoing disadvantages associated with prior art commutators in which the segments are secured in a similar way.

Briefly stated, in accordance with one aspect of my invention, I employ an improved arrangement for holding commutator segments in a supporting hub by providing co-acting interlocking elements on each segment and the hub for holding the segments in a preset position and for precluding their displacement when subjected to centrifugal forces. The interlocking elements are designed in a fashion to permit utilization of insulating materials between the segments and hub which exist at different voltage levels.

While the specification concludes with claims particularly pointing out and distinctly claiming the subject matter which I regard as my invention, it is believed the invention will be better understood from the following description taken in connection with the accompanying drawings in which:

Figure 1:
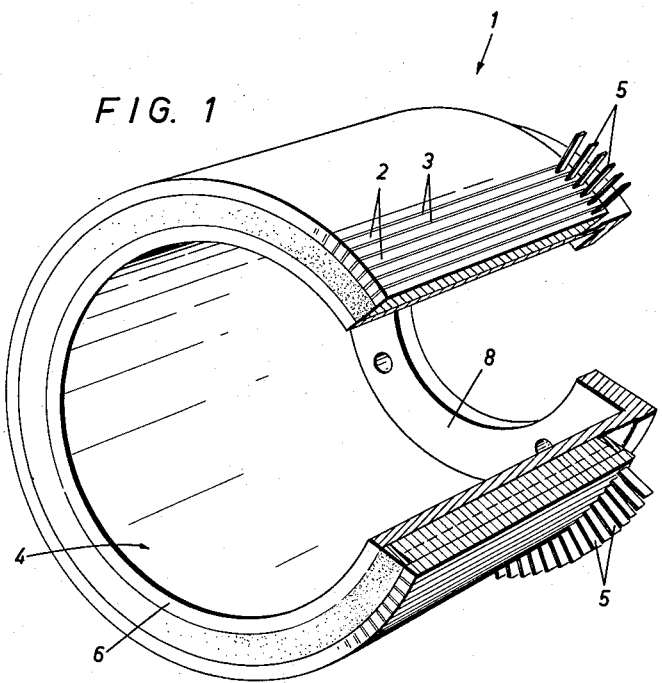
FIGURE 1 is a perspective view of a commutator constructed in accordance with the invention in which a portion is shown broken away to expose the means employed to secure the segments to the support.

Referring now to the drawings wherein like reference characters designate like or corresponding parts throughout the several views, there is shown in FIGURE 1 a commutator 1 constructed in accordance with my invention and comprising a plurality of segments 2 and insulating barriers 3 arranged alternately in the form of an annulus which surrounds a support 4 and to which the segments are secured by means to be described later. Each segment may be provided with a lead 5, which leads serve as conductors for connecting an armature winding to segments 2.

Figure 4:
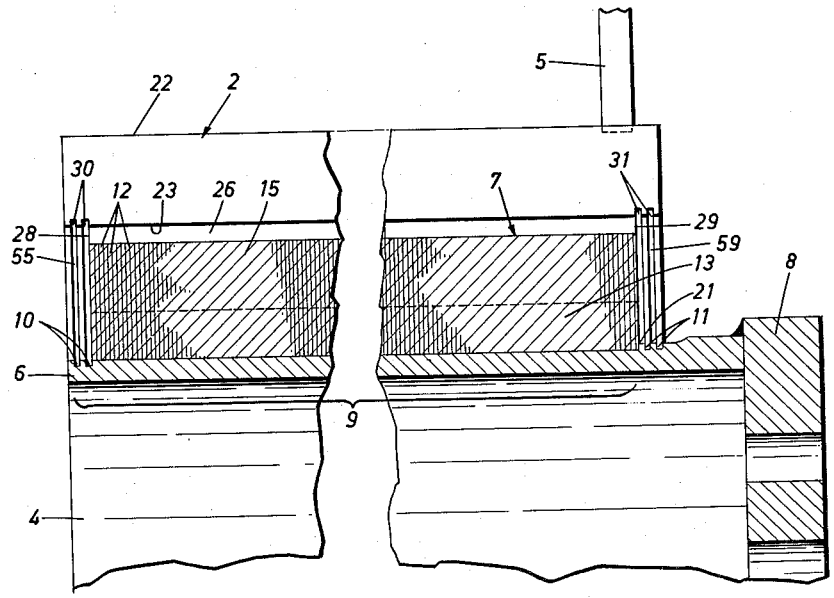
FIGURE 4 is a section taken along 4—4 of FIGURE 2.

A support found suitable for large commutator sizes is best illustrated in FIGURE 4 as comprising a cylindrical shell 6 on which there is mounted a core member 7. Shell 6 may be fabricated from steel plate rolled into circular contour and welded together and welded to an annular flange 8 which projects radially inward from one end of the shell and which is provided with a series of holes adapted to receive bolts for bolting the flange to ribs of an armature whereby the commutator is supported on the armature. A portion 9 of the periphery of the shell is machined to an outside diameter somewhat less than the outside diameter of the remainder of the shell. In addition, annular grooves 10 are machined in the periphery of the shell adjacent the left hand end thereof (FIG. 4) and grooves 11 are machined in the periphery of the unmachined shell adjacent the terminus of the machined portion 9. Core 7 may be a solid body but for ease of manufacture a stack of identical laminations 12 is preferred because the lamination may be punched readily from steel plate to the required shape. Each lamination 12 is a ring-like punching having a body portion 13 of which the inner circular edge 14 is an interference fit with the machined portion 9 of the shell and from which there projects outwardly a continuous, circular row of equally spaced teeth 15, each of which has an enlarged extremity 16 whereby adjacent teeth define semi-closed slots 17. The teeth illustrated in FIGURE 2 consist of a straight portion 18 projecting radially outward from body portion 13 and terminating in an offset or hook-like portion 19, the spacing between adjacent portions 19 being substantially less than the spacing between corresponding portions 18, whereby portions 19, 18 define slots 17 each of which has an opening 20 substantially narrower than the slot proper. Laminations 12 may be shrunk onto the shell portion 9; that is, they may be expanded by means of heat, fitted onto the shell and then allowed to cool. It is to be noted from FIGURE 4 that the innermost lamination rests on annular shoulder 21 where the machined portion 9 ends, and a compact stack of laminations extends from here to the inside groove 10. In stacking the laminations, they are arranged such that the respective teeth 15 are in axial alignment, that is, the teeth and slots of the core stack are parallel to the axis of shell 6. During the stacking of the laminations a number of guide pins may be distributed around the periphery of the core in the slots to ensure good punching-to-punching registry. Since the teeth are parallel to the axis of shell 6, the headed portions of the teeth will be aligned in a similar way, hence the offset portion 19 of a row of contiguous teeth will constitute a longitudinal flange.

The forces acting on a support for the segments of a commutator during rotation thereof tend to pull the commutator apart and the stresses induced in the supporting structure by such forces are often referred to as "hoop stresses." A core structure built up from a stack of annular punchings provides a strong support well adapted to withstand these so called "hoop stresses." Although each lamination 12 described above has been a one-piece annular punching, it is also within the scope of this invention to employ annular laminations which are divided into a number of segments. Segmental laminations reduce waste material and make it possible to use smaller sizes of plate stock, but when used they must be overlapped and keyed together in a way which will produce a strong support. The laminations may be secured together by means of pins extending axially through the stack, by welding or by other means known in the art for securing the plates of a laminated rotor.

Figure 2:
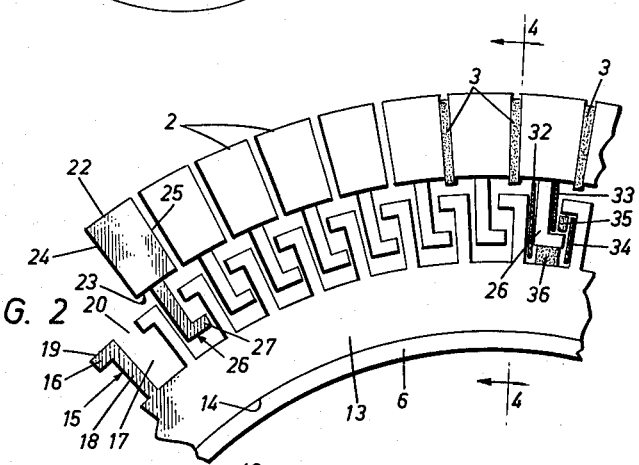
FIGURE 2 is an end view of a portion of the novel commutator before the resin is applied.

In FIGURE 2 there is shown a plurality of identical commutator segments adapted for use with support 4. Each segment 2 may be cut to the required length from copper stock of uniform cross-section of the shape illustrated wherein the segment has a brush contacting surface 22, a base 23 and sides 24, 25 which converge toward the base in the usual way in order that the segments will fit properly into the annular arrangement of segments in the assembled commutator. Integral with the body of the segment and projecting downwardly from base 23 thereof is an L-shaped root portion which consists of a relatively narrow necked portion 26 and a headed or flanged portion 27 projecting from the extremity of the necked portion to the right as clearly shown in FIGURE 2. The ends of the L-shaped portion of each segment may be cut away as illustrated at 28 and 29 in FIGURE 4 and base 23 of each segment at the cutaway sections may be notched as indicated at 30 and 31 for a purpose to be considered later. After removing portions 28 and 29, the L-shaped root portion is substantially the same length as the axial length of core 7.

To facilitate assembly of segments 2 to support 4, the support is placed on end on a plane horizontal surface with the end grooved at 10 resting on the plane surface. Hence the axis of support 4 now will be near vertical and flanged end 8 of the shell will be uppermost. Segments 2 may be assembled one by one to support 4 by inserting the headed portions 27 endwise into respective slots 17 from the upper end of the support. In the assembly of segments around the core, the headed portion 27 of each segment is positioned in a respective one of the slots such that when the lower end of a segment rests on the plane surface the ends of its root portion 26, 27 are substantially flush with the ends of the core. Once the segments are in place around the core, insulating barriers 3 can be inserted between the segments. With reference to FIGURE 2, it is to be noted that each slot has positioned loosely therein a headed portion of a segment, the necked portion 26 thereof passing through the slot opening 20 in spaced relation to the walls defining the slot opening, and the headed portion 27 resting in the slot proper in spaced relation to the wall thereof. At this stage, each segment has freedom of limited movement radially but its movement outwardly is stopped by the headed or flanged portion 27 on the segment interlocking with the hook like or offset portion 19 which juts out from the end of each tooth over the slot. The interlocking relationship of portions 27, 19 is clearly illustrated in FIGURE 2 as is the spacing between the root portion 26, 27 of a segment and the inner surface of a slot.

If the voltage between segments 2 and steel core 7 will be appreciable, it may be desirable to insulate each segment from the core by means of barriers 32, 33 and 34 in the way illustrated in FIGURE 2. The segments are sufficiently loose in the assembly to allow a barrier to slide into a slot from the upper end thereof into the positions where barrier 32 is on the left hand side of neck portion 26 between the bottom of the slot and base 23 of the segment, barrier 33 is on the other side of neck portion 26 between head portion 27 and base 23 of the segment, and barrier 34 is along the right hand side of the slot between the bottom thereof and the head of the tooth. The insulating barriers are slightly longer than the root portions 26, 27 of the segments and are positioned in the slots to project beyond both ends thereof. A material such as glass tape impregnated with a polyester resin is a suitable barrier material because it is sufficiently stiff and springy to enable insertion of the barriers into the slot. However, in some instances it may be convenient to insert the insulating barriers into the slots before the segments are inserted.

The use of individual barriers such as 32, 33 and 34 is a convenient means for insulating the segments from the core, but other means well known may be preferred in some instances. For example, each slot 17 may be lined with a continuous sheet of insulating material, and it may project radially from slot opening 20 to provide a continuous insulating barrier between the core and each segment. In another convenient arrangement, a U-shaped slot liner may be positioned in each slot in the way that liners are provided in winding receiving slots, and an inverted U-shaped barrier may be placed around the headed portion of each tooth with the sides of the U-member projecting down into adjacent slots in overlapping relationship to provide at least one thickness of insulation between the core and the segments.

After the segments have been arranged around the support such that a root portion of each segment is within a slot in spaced relationship therewith and base 23 of the segments is spaced substantially uniformly with respect to the outer ends of the teeth, the segments are clamped together by banding means adapted to exert on each segment a force which tends to drive the segment radially inward and thereby stress segments 2 and insulating barriers 3 in compression, thus providing a rigid annular structure. In order to obtain proper curvature of the peripheral surface of the segments before too much arch pressure is developed, the segments can be made to bottom on spacers 36 one of which is placed in the bottom of each slot (FIGURE 2). The segments can be brought into position on the spacers by tapping them inwards with a mallet and if they cannot be positioned properly by tapping, the thickness of barriers 3 may be varied. Once the segments bottom on the spacers the spacers must be removed, but this may be delayed until later because the assembly is easier to handle when the spacers are in place. It may be necessary to temporarily relax the banding pressure to remove the spacers. When the segments are positioned with the aid of spacers, it is possible to obtain a uniform radial clearance between the inner edges of the segments and the bottoms of the slots. During the clamping operation the operator should take precautions to maintain the spaced relationship between the segments and the teeth of the core.

For small diameter commutators a simple bell-mouthed ring may be pressed endwise onto the annulus of alternate segments and barriers so as to surround a substantial portion of the peripheral surface of the annulus. The inside diameter of the ring is such that the inner surface thereof engages the peripheral surface of the annulus as an interference fit whereby the segments and barriers are clamped together. However, for larger commutators such as the type illustrated in FIGURE 1 a clamping means of the type shown in FIGURE 3 is preferred.

Figure 3:
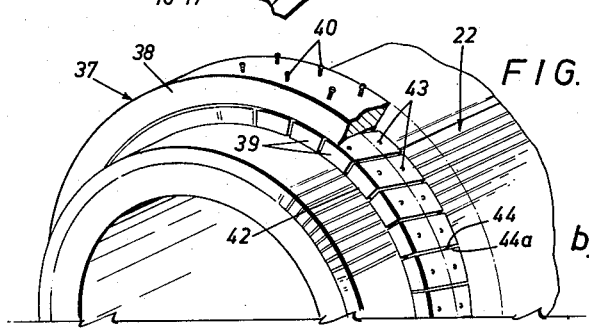
FIGURE 3 is a perspective view of a means employed to temporarily clamp the segments in annular form during the construction of a commutator.

The clamping means shown in FIGURE 3 comprises one or more adjustable clamps 37 placed around the commutator at spaced intervals for applying to the segments forces which tend to drive the segments radially inward and thereby force them together in the way that steel bands on a wooden barrel tend to force the staves together. Clamp 37 has an outer annulus 38 and disposed therewithin is a plurality of closely spaced arcuate segments 39 which are arranged in annular form and movable radially with respect to annulus 38 whereby the diameter of the circle defined by the inner curved surfaces 42 of the annulus of segments 39 can be varied by turning screws 40. Screws 40 are threaded radially inward through annulus 38 to the position where the rounded tips of the screws enter sockets 43 of segments 39 to provide a ball and socket means for supporting the segments on the screws. It is to be noted with reference to FIGURE 3, that the inner adjacent edges 44, 44a of segments 39 are at an acute angle with respect to the axis of clamping ring 37. That is, two adjacent segments 39 overlap two or more commutator segments so as to provide a continuous circular grip on the periphery of the commutator, thus making it possible to progressively reduce the diameter of surface 42 by progressively tightening down screws 40 a little at a time.

Preferably, a locking piece 35 is now inserted into each slot from an end thereof into the position shown in FIGURE 2 where it spaces the head portion 27 of the segment from flange 19 of the tooth. At this stage of assembly, the locking pieces assist in positioning the root portions of the segments in the slots in spaced relationship therewith and later on in the completed commutator construction they function in another important way which will be described at the appropriate time. Locking pieces 35 should be strong and hard and may be strips of polyester impregnated glass of cross-section which conforms with the configuration of the root portion of the teeth and the slots, a rectangular cross-section being illustrated in FIGURE 2.

The final step in constructing the novel commutator consists of filling the vacant spaces between the commutator segments and the core with a resinous material which will permanently secure the segments to the core to provide a strong, rigid commutator structure. There are a number of suitable resinous materials available such as epoxy or polyester resins. An epoxy resin is preferred and as a result the disclosure to follow will be directed to the use of an epoxy resin which can be rendered sufficiently liquid to ensure resin flow into the spaces between the commutator segments and core teeth.

Figure 5:
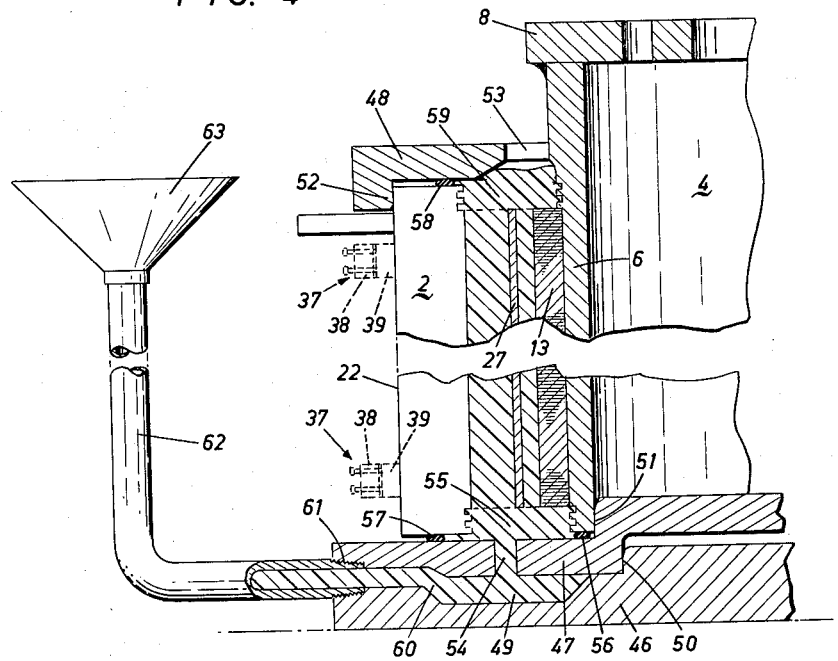
FIGURE 5 is a drawing in section showing a portion of the commutator and fixtures for temporarily supporting the commutator during construction thereof.

To apply the resin, it is desirable to place the assembly of segments and support in a suitable fixture wherein the segments are positioned vertically and the flange of the support is uppermost (FIGURE 5). This fixture may consist of three essential parts, namely; a base plate 46, a lower mould plate 47 and an upper mould plate 48. Base plate 46 is provided with an annular cavity 49 in its upper side and a circular upstanding shoulder 50 for accurately positioning mould plate 47 on the base plate over the cavity. Mould plate 47 is provided with a similar shoulder 51 adapted to fit inside the end of shell 6 for positioning the assembly of segments and support on mould plate 47. Mould plate 48 is provided with a large central aperture 53 and a downwardly projecting circular shoulder 52 for positioning the upper mould plate on the upper end of the assembly of segments and support. A number of passages 54 in plate 47 bring cavity 49 into communication with an enclosed annular cavity 55 defined by segments 2, core 7, shell 6 and plate 47. Segments 2, core 7, shell 6 and plate 48 define an upper annular cavity 59 which is open at the top through aperture 53 and which communicates with the lower cavity 55 through the passage formed by the spacing between the root portions of segments 2 and the teeth of core 7. Annular compressible gaskets 56 and 57 interposed between mould plate 47 and the lower ends of shell 6 and segments 2 respectively provide a seal for rendering cavity 55 substantially liquid tight. A similar gasket 58 interposed between the upper end of segments 2 and mould plate 48 provides a liquid tight seal between the segments and the upper mould plate. A hole 60 drilled radially into plates 46 and 47 from the edges thereof forms an entrance passage to cavity 49. The outer end of hole 60 may be threaded at 61 to receive a standpipe 62 having a funnel-shaped mouth 63. It is to be noted that the cutaway portion 28 of each commutator segment combines to form the outer portion of cavity 55 and that insulating barriers 32, 33 and 34 project down into this particular portion of the cavity. Similarly, the cutaway portion 29 of each segment combines to form the outer portion of cavity 59 and that insulating barriers 32, 33 and 34 project up into this particular portion of the cavity.

Before the assembly of support, segments and clamps is placed in the fixture as shown in FIGURE 5 and during handling while cavity 55 is accessible, this cavity may be packed lightly with glass roving. It is a convenient time after the assembly is finally in place on the lower mould plate to remove all of the spacers 36, which up to this time have helped to hold the assembly together during handling thereof. The upper mould plate may now be placed on the upper end of the assembly, and cavity 59 filled with lightly packed glass roving. All of the fixture surfaces coming into contact with the moulding resin are coated with a mould releasing substance to facilitate dismantling and cleaning of the fixture. It may be desirable also to coat certain areas of the commutator where adherence of the resin is unwanted.

In order to obtain optimum resin flow in the commutator and thereby minimize the formation of bubbles and voids, the commutator should be preheated to a uniform temperature of about 80° C. After the resinous composition has been heated to a temperature of about 80° C. and thoroughly mixed to bring it to a liquid consistency suitable for moulding purposes, it is introduced into cavity 49 at a rapid uniform rate by pouring it into mouth 63 of standpipe 62. The head of liquid resin in the standpipe forces the resin in cavity 49 up through passages 54 into cavity 55 and thence up through slots 17 into cavity 59, the air inside the mould being displaced by the resin and expelled through aperture 53. The entire filling operation is done via the standpipe and the resin level is kept well up at all times in order to minimize the formation of bubbles and reduce the pouring time. An excess of resin may be passed through the commutator in order to flush out as much entrapped air as possible. A predetermined level of resin can be maintained in cavity 59 by draining off any excess through an open channel in the upper surface of mould plate 48 or through radial holes in shell 6 at the appropriate level. As the resin flows upwardly from cavity 55, it fills the vacant spaces between the root portions of the segments and the teeth of the core so as to envelop these elements in resin.

Because some volumetric shrinkage of the resin may occur during the curing cycle, it is possible to provide for some makeup by raising the level of the resin in cavity 59 above the upper end of the commutator segments and maintaining a corresponding level of resin in the standpipe. After the resin has been cured to a solid, infusible state and the temperature of the commutator has returned to room temperature, the fixture is removed and projecting bits of surplus resin cut away.

The final product is a solid, rigid, unitary commutator structure wherein segments 2 are bonded firmly along the length thereof to support 4 by the cured resin in the spaces between the support and the segments. Moreover, the mass of resin is continuous, extending from within the slots in the core into cavities 55 and 59 where it is reinforced by the glass roving and keyed to the shell and to the segments by annular grooves 10, 11, 30 and 31. In addition to the mechanical strength imparted to the structure by the resin, the resin exhibits good insulating properties as well and therefore contributes materially in insulating the segments from the support. In certain applications where the voltages are low, insulating barriers 32, 33 and 34 may be dispensed with, in which case the resin alone insulates the segments from their support. By having barriers 32, 33 and 34 project beyond the ends of core 7 into the bodies of cured resin at the ends of the core, the insulation against creepage from the segments to the support is improved considerably. Similarly, barriers 3 extend below the bases 23 of the segments into the resin to improve the creepage resistance between segments.

Reference has already been made to locking pieces 35 and one reason for their use. However, their main purpose is to be found in the completed commutator structure where they serve as structural members for transmitting forces from heads 27 of the segments to flanges 19 of the teeth. There is always a remote possibility that some shrinkage of the resin may occur inside the commutator structure, and in view of this the presence of locking pieces 35 is considered to be added insurance against any movement of the segments.

Earlier in the specification, it was pointed out that commutators having segments rooted in a plastic support were well known in the art, but that such commutators were limited to very small sizes due to the inherent weakness of plastic to stresses in tension. In the commutator described herein, the centrifugal forces which tend to drive the segments radially outward are transmitted from head portion 27 of a segment to the flange or hook-like portion 19 of a tooth through the medium of the resin and locking piece 35 lying between elements 27 and 19. These forces stress the medium in compression, thereby utilizing the resin in a way which it is strongest. The remainder of the resin may contribute in a small way to restraining the segments against radial movement. The resinous body also restrains the segments against angular and axial movement but the forces tending to cause such movement are small compared to the centrifugal and thermal forces.

In summary, the method of making the novel commutator follows the general steps outline below:

(1) Constructing a cylindrical, core-like support which has extending radially inwardly from the periphery thereof a plurality of circumferentialy spaced, longitudinally extending undercut slots;

(2) Providing a plurality of commutator segments each of which has along the inner edge thereof a root portion comprising a longitudinally extending, relatively narrow necked portion terminating in a longitudinally extending headed portion;

(3) Assembling the segments and alternate insulating barriers around the support by inserting endwise into each slot at least one of the headed portions such that it rests in the slot proper in spaced relationship therewith and the necked portion projects radially out of the slot opening in spaced relationship therewith;

(4) Temporarily securing the arrangement of segments and insulating barriers in annular form and at the same time maintaining the spaced relationship between the segments and the support;

(5) Injecting a resinous material into the spaces between the segments and the support, which material is sufficiently liquid in state that it can be made to flow into the spaces; and (6) Thereafter curing the resin to its hard, infusible state by means of heat, a curing agent or preferably a combination of the two.

Epoxy, epoxide or ethoxyline resins, as they are variously called, are well known in the art. Generally, such epoxy resins comprise a polyester derivative of a polyhydric organic compound, said derivative containing 1,2 epoxy groups, the compound being selected from the class consisting of polyhydric alcohols and phenols containing at least two phenolic hydroxy groups. For example, United States Patent 2,324,483 dated July 23, 1943, to Castan discloses epoxy resin compositions comprising the reaction product of phenols having at least two phenolic hydroxy groups and an epihalogenohydrin such as epichlorohydrin, the product having at least two epoxy groups and being cured to a thermoset, infusible mass by the use of a carboxylic or polybasic acid or acid anhydrides such as phthalic anhydride. Other acid type curing agents for epoxy resins include hexachloroendomethylenetetrahydrophthalic anhydride. The use of organic nitrogen base or amine type materials to cure epoxy resins is also well known as set forth, for example, in United States Patent 2,444,333, dated June 29, 1948, such materials often giving a rapid cure at room temperature. The use of boron trifluorideamine complex materials as epoxy resin curing agents is also well known as disclosed, for example, in United States Patent 2,717,885 dated September 13, 1955. United States Patents 2,494,295—January 10, 1950; 2,500,600—March 14, 1950 and 2,511,913—June 20, 1950, describe further ethoxyline resins.

It is also well known to fill resins such as epoxy, and a number of fillers having suitable electrical and mechanical properties are available. A formulation found to give good results consisted of the following:

| | Parts by weight |
|---|---|
| Epoxy resin | 100 |
| Silica flour | 100 |
| Red pigment | 1 |
| Hardener | 28.5 |

The epoxy resin and hardener referred to in the above formulation, which were found to give good results, may be more particularly described as follows:

Epoxy resin:
  Assay, gr. per gr.-mole epoxy _____ 185–200.
  Viscosity, cps., at 77° F _____ 11,000–14,000.
  Specific gravity _____ 1.15–1.17.
  Hardener _____ 4-4' methylene dianiline.

The silica flour filler was a finely divided (325 mesh) crystalline silica having the following chemical analysis:

| | Percent by weight |
|---|---|
| Silica ($SiO_2$) | 99.82 |
| Iron oxide ($Fe_2O_3$) | 0.019 |
| Aluminum ovide ($Al_2O_3$) | 0.049 |
| Titanium oxide ($TiO_2$) | 0.012 |
| Lime (CaO) | 0.006 |
| Magnesia (MgO) | 0.031 |
| Loss on ignition | 0.070 |

In the preparation of the above mixture, the epoxy resin was heated to 80° C. before adding the silica flour and pigment to it, after which the ingredients were mixed thoroughly and the temperature of the mixture raised to 80° C. Before adding the hardener, it was heated to 80° C. to render it miscible with the hot resin mixture. The final mixture was sufficienly fluid at 80° C. to enable it to flow freely into the spaces between the commutator segments and support. The complete commutator assembly was heated to 80° C. and the resin mixture, also at 80° C., was poured into the annular space. The assembly and resin were allowed to cool at room temperature for 16 hours, then placed in an oven and baked for two hours at 125° C. followed by four hours at 160° C. The heat supply was then shut off and the cast assembly was allowed to cool to room temperature in the closed oven, which time required twelve to sixteen hours. It is to be noted that the above-mentioned specific formulation together with its method of application and curing has been given by way of example only. Those skilled in the art are well aware that numerous other formulations can be used and a like degree of success expected.

Figure 6:
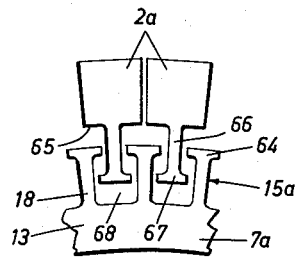
FIGURES 6 to 10 are diagrammatic drawings similar to FIGURE 2 in which other configurations and arrangements of the support and the segments are illustrated.

FIGURE 6 illustrates another suitable core and segment arrangement. Core 7a is very much like core 7 in that it too has an annular body portion 13 from which teeth 15a project radially outward to define slots 68. Each tooth 15a has a narrow straight portion 18 terminating in a head portion 64 which projects from both sides of the tooth to provide a T-shaped tooth configuration. Segments 2a have a root portion which is T-shaped in cross section, but these segments are otherwise the same as segments 2. The root portion of segment 2a consists of a base portion 65 from which there projects radially inward a necked portion 66 terminating in a headed portion 67. The root portion of each segment is positioned within a slot 68 such that neck portion 66 extends through the slot opening and head portion 67 rests inside the slot, all portions of the segment being spaced from all portions of the core as illustrated in the figure. Since head portion 67 is substantially wider than the slot opening, centrifugal forces acting on segments 2a place the resinous material between the heads of the segments and the heads of the teeth in compression, thereby utilizing the resin in a way in which it is very strong.

Figure 7:
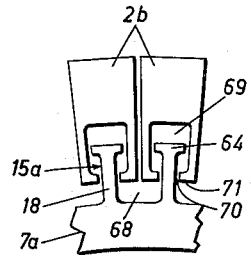

There is shown in FIGURE 7 another arangement wherein the number of segments, teeth and slots are equal as was the case with FIGURES 2 and 6. The core structure in FIGURE 7 is exactly the same as the core structure in FIGURE 6 but the root of each segment 2b is formed in a different way. The root portion of segment 2b contains an undercut slot 69 which extends lengthwise of the segment and which has an opening 70 in base 71 of the segment; this slot opening is substantially narrower than the slot proper. In the assembly illustrated, straight portion 18 of a tooth 15a projects radially into slot 69 through its opening 70 so as to place head portion 64 inside slot 69. Again, the slots and teeth are so proportioned as to provide ample space therebetween for the resinous material used to secure the segments to the core structure.

Figure 8:
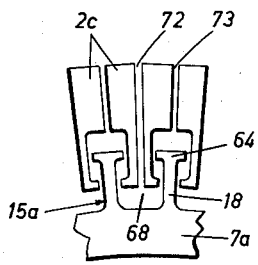

A glance at FIGURE 8 will show clearly that the arrangement in this figure is very similar to the arrangement shown in either FIGURE 6 or FIGURE 7. When a segment such as 2a or 2b is split along a radial plane containing the axis of the commutator, two identical segments such as 2c are obtained. Therefore, the commutator of FIGURE 8 will have twice as many segments as it has slots 68 or teeth 15a. Segments 2c alternate between being placed back-to-back as indicated at 72 or face-to-face as indicated at 73. Each pair of back-to-back segments 2c is secured to core 7a in the same way as a segment 2a, and each pair of face-to-face segments in the same way as a segment 2b.

Figure 9:
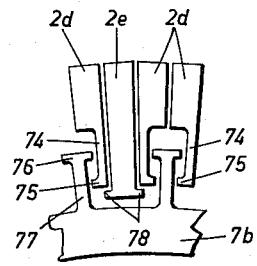

The FIGURE 9 arrangement is characterized by three segments per core slot wherein pairs of segments 2d alternate with single segments 2e. In this arrangement two segments 2d, similar to segments 2c, are placed back-to-back in spaced relationship with a third segment 2e sandwiched between them. Each segment 2d is provided with an L-shaped root portion 74, the foot 75 of which is adapted to interlock with a head portion 76 on a core tooth 77 through the resin medium filling the spaces between the segments and core 7b. Each segment 2e has on its base flanges 78 which hook under the heels of feet 75 to lock a segment 2e to each pair of back-to-back segments 2d. It is possible to eliminate one of the flanges 78, in which case a segment 2e is locked to only one segment 2d. It is to be noted that flanges 78 are spaced from feet 75 to provide a space therebetween for the resinous material which is used to secure the segments and electrically insulate one from another.

Figure 10:
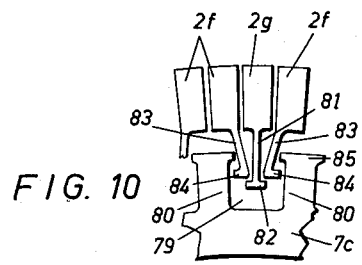

In FIGURE 10, the arrangement of three segments per slot is very similar to that of FIGURE 9. However, in FIGURE 10, it is possible to have a narrower slot 79 and therefore a wider tooth 80 because the root portion of a segment 2g is much reduced in width compared to the root portion of segment 2e. In this arrangement pairs of segments 2f alternate with single segments 2g and two segments 2f are placed back-to-back in spaced relationship with a third segment 2g sandwiched between them. Segment 2g is provided with a T-shaped root portion having a long, narrow necked portion 81 extending through the opening of slot 79 so as to position head portion 82 well down in the slot. Each segment 2f is provided with an L-shaped root portion having a necked portion 83 inclined through the slot opening towards the necked portion 81 and a headed portion 84 located in the slot between head portion 82 on segment 29 and head portion 85 on a tooth 80. Headed portions 82 and 84 are spaced from each other and from teeth 80 leaving spaces for the resin. In FIGURES 9 and 10, segments 2e and 2g are positioned centrally of the slots and pairs of adjacent segments 2d and 2f centrally of the teeth.

Assembly of the commutator structures illustrated in FIGURES 6 to 10 follows the procedural steps outlined in connection with the preceding figures. That is, the support is set on end, the segments are placed on end around the support by inserting the root portion of the appropriate number of segments in each slot from the upper end thereof, the insulating barriers are placed between the segments and in the slots, the array of segments is temporarily clamped together in annular form with the segments spaced from the teeth and other parts of the core, the assembly of segments and support is placed in a suitable mould, the fluid resin is introduced into the mould and forced into all the vacant spaces between the segments and between the segments and the core and finally the resin is cured to a hard infusible state. The final commutator structures have the segments thereof secured to the core along the entire axial length of each segment by means of the cured resin. The major portion of the mechanical loads on the segments due to centrifugal forces are transmitted to the teeth by compressing the resinous material located between the head portions of the segments and the head portions of the teeth. Locking pieces such as 35 (FIGURE 2) may be applied to the structures illustrated in FIGURES 6 to 10 to assist in the transmission of the centrifugal forces from the segments to the teeth.

It will be apparent that other manufacturing processes may be employed in assembling the commutator segments on the hub which may be of the laminated type disclosed or of solid construction. For example, in lieu of placing the segments individually into the slots, they may be assembled in a circular manner as a unit with mica or other insulation located between the adjacent commutator segments. A steel band then is placed around the outer peripheral surface and contracted in a manner to bind all the segments into a rigid mass of copper. The unit thus formed is lifted and the outwardly projecting necks are positioned in the grooves previously provided in the hub. The process of inserting barriers 32, 33 and 34 and the locking or filler pieces 35 and the resinous composition may be followed as previously described.

Variations in the segment thickness including the mica insulation, neck and head portions and the width of the slots are such that the distances between the segment neck portions and slot walls are not constant. Therefore, it is evident that the barriers 32, 33 and 34 and locking pieces 35 may constitute a multiplicity of thin strips of the same material. In lieu of providing a single locking or filler piece 35, strips of lesser thickness may be used thereby permitting accommodation in the variations mentioned above.

Although several different modifications have been illustrated disclosing various designs of the neck portions in the slots, it will occur to those skilled in the art that still different arrangements may be resorted to. Illustrative of this is the design where a segment such as 2e in FIGURE 9 may be positioned between segments 2d such that the flanges 78 are located above or radially outward from head portion 76. Preferably segment 2e would be split down the middle or radially through the center to provide two portions effective in locking the elements together.

Moreover, the width of the hub slots may vary around the periphery to accommodate such variations previously discussed. Adjacent slots may differ in width and a definite pattern in slot width variation may or may not be used according to the dictates of a particular design and dimension of machine.

In view of the above, it will be evident that many modifications and variations are possible in light of the above teachings. It therefore is to be understood that within the scope of the appended claims, the invention may be practiced other than as specifically described.

What I claim as new and desire to secure by Letters Patent of the United States is:

1. A commutator for a dynamoelectric machine comprising a hub having a plurality of spaced teeth projecting radially therefrom and flange means formed on the outer extremity of each tooth, an annular arrangement of discrete commutator segments surrounding said hub in substantially coaxial relation therewith, means integral with the inner ends of said segments interlocked with the flanges on said teeth but located in spaced relation thereto, and a bonding material filling the spaces between said segments, teeth and hub to form a solid, elastic mass effective in securing the segments to the hub.

2. A commutator for a dynamoelectric machine comprising a hub having a plurality of spaced teeth projecting radially outward along the hub length and flange means on the extremity of each tooth, an annular arrangement of commutator segments insulated from each other and surrounding said hub in substantially coaxial relation therewith, each segment including means integral with its inner end for interlocking with at least one of the flanges on said teeth but positioned in spaced relation therewith, insulating material between said segments and said teeth, and a resinous material filling the spaces between said segments, insulating material, teeth and hub, said resinous material comprising a solid, elastic mass bonding the segments to the hub.

3. A commutator for a dynamoelectric machine comprising a cylindrical hub having a plurality of spaced slots parallel to the axis of the hub and extending radially inward from the peripheral surface, each of said slots having an opening at said peripheral surface of substantially reduced width as compared with that of the slot proper, a plurality of commutator segments insulated from one another and positioned side by side around said hub coaxially therewith, the inner end of each segment having a neck portion disposed in one of said slot openings and a head portion disposed in the slot proper, said neck and head portions spaced from the walls of said slot so as to define a vacant space between all points of the hub and each commutator segment, and a resinous material filling the vacant spaces between said segments and said hub, said resinous material comprising a solid, elastic mass bonding the segments to the hub.

4. A commutator for a dynamoelectric machine comprising a preformed cylindrical hub having a plurality of equally spaced slots substantially parallel to the hub axis and extending radially inward from the hub peripheral surface, each of said slots having an opening at said peripheral surface of substantially reduced width as compared with that of the slot proper, a plurality of commutator and insulation segments placed alternately to form an annulus encircling said hub coaxially therewith, the inner end of each segment having a neck portion disposed in one of said slot openings and a head portion disposed in the slot proper, said neck and head portions spaced from the walls of said slot so as to define a vacant space between all points of the hub and each commutator segment, insulation between each segment and said hub partially filling said vacant spaces, and a resinous material completely filling the remainder of said vacant spaces, said resinous material comprising a solid, elastic mass bonding the segments to the hub.

5. A commutator for a dynamoelectric machine comprising a preformed cylindrical hub having equally spaced radially projecting teeth along the length thereof, said teeth being substantially parallel to the axis of said hub, a head portion on the extremity of each tooth, a plurality of commutator segments placed side by side around said hub, the inner end of each segment provided with means cooperating with at least one of said head portions for loosely retaining the segments on the hub, and a resinous material spacing said segments from said hub and securing them thereto.

6. A commutator for a dynamoelectric machine comprising a preformed cylindrical hub having a plurality of equally spaced slots substantially parallel to the axis of the hub and extending radially inward from the peripheral surface of the hub, each of said slots having an opening at said peripheral surface of substantially reduced width as compared with that of the slot proper, a commutator segment for each slot, each segment having a neck portion projecting from the inner end thereof through said slot opening in spaced relation thereto and into the slot proper, a head portion on the inner extremity of said neck portion, said head portion positioned in said slot proper in spaced relation thereto and having a transverse dimension substantially greater than the width of the slot opening thereby limiting radial movement of the segment with respect to the hub, a multiplicity of spacers between said neck and head portions wedging the latter in the slots, and a resinous material filling the voids between said hub and said neck and head portions whereby each segment is securely retained in spaced relation to the hub and bonded thereto.

7. A commutator for a dynamoelectric machine comprising a preformed cylindrical hub having a plurality of equally spaced slots substantially parallel to the axis of the hub and extending radially inward from the peripheral surface of the hub, each of said slots having an opening at said peripheral surface of substantially reduced width as compared with that of the slot proper, a pair of commutator segments for each slot adapted to be secured therein, each one of said pair of segments having a neck portion projecting from the inner end thereof through said slot opening in spaced relation thereto and into the slot proper, a head portion on the inner extremity of said neck portion, said head portions of said pair of segments positioned in said slot proper in spaced relation thereto and having a combined circumferential dimension substantially greater than the width of the slot opening thereby limiting radial movement of the pair of segments with respect to the hub, spacer means filling the spaces between said neck and head portions and the slot walls and including a resinous material filling the remaining voids whereby each segment is securely retained in spaceed relation to the hub and bonded thereto.

8. A commutator for a dynamoelectric machine comprising a cylindrical hub having radially projecting spaced teeth extending along the hub length and substantially parallel to the axis thereof, a flange on the tip of each tooth projecting transversely from both sides thereof, said flanges on two adjacent teeth spaced apart a distance substantially less than the spacing between two adjacent teeth, a pair of back to back commutator segments adapted to be secured between each pair of adjacent teeth along the inner edges of the segments, said pair of segments having a portion of reduced thickness positioned between adjacent flanges in spaced relation thereto and a bulbous root portion positioned between adjacent teeth under the flanges thereof in spaced relation to the hub, and fillers including a resinous material filling the spaces between said hub and said segments whereby said segments are secured to said hub.

9. A commutator for a dynamoelectric machine comprising a preformed cylindrical hub having spaced teeth projecting radially along the length thereof and substantially parallel to the hub axis, a flange on the tip of each tooth projecting transversely from both sides thereof, said flanges on two adjacent teeth spaced apart a distance substantially less than the spacing between two adjacent teeth, at least three commutator segments secured between each pair of adjacent teeth along the inner edges of the two outer segments, said three segments having a portion of reduced thickness positioned between adjacent flanges and located in spaced relation thereto, a root portion projecting outwardly from each one of said two outermost segments, said root portion disposed between adjacent teeth under the flanges and in spaced relation to the hub, at least one inner edge on the intermediate segment projecting under the inner edge of at least one of said outer segments for locking the inner segment thereto, filler means and a resinous material filling the void spacer in said slots and effective in bonding the segments to said hub.

10. A commutator for a dynamoelectric machine comprising a hub having outwardly projecting first hook-like members extending along the hub length, an annular arrangement of commutator segments surrounding said hub, second hook-like members projecting radially inward from said segments along the length thereof, said first and second hook-like members interlocking in spaced relation so as to limit radial and angular movement of the segments with respect to the hub, filler means filling the space between said members, and a resinous material in which said first and second hook-like members and filler means are embedded whereby said segments are secured to said hub in spaced relation therewith.

11. The commutator according to claim 10 wherein the space formed between adjacent first hook-like members defines slots respectively for reception of the second hook-like members on the segments.

12. The commutator according to claim 11 wherein the filler means comprises a multiplicity of individual strips of insulating material positioned between the first and second hook-like members.

References Cited by the Examiner
UNITED STATES PATENTS 1,287,309  12/18  Hensley _____ 310—235

FOREIGN PATENTS 225,237  4/43  Switzerland.
874,619  4/53  Germany.

MILTON O. HIRSHFIELD, *Primary Examiner.*